(12) United States Patent
Midgen et al.

(10) Patent No.: US 11,057,334 B2
(45) Date of Patent: Jul. 6, 2021

(54) MESSAGE CLASSIFICATION AND MANAGEMENT

(71) Applicant: Microsoft Technology Licensing, LLC, Redmond, WA (US)

(72) Inventors: Paul M. Midgen, Redmond, WA (US); Vasantha K. Vemula, Redmond, WA (US); Krishna Vitaldevara, Redmond, WA (US); Jason D. Walter, Redmond, WA (US); Eliot C. Gillum, Redmond, WA (US); Mihai Costea, Redmond, WA (US); Douglas J. Hines, Redmond, WA (US); Wei Jiang, Redmond, WA (US); Malcolm H. Davis, Redmond, WA (US); Samuel J. L. Albert, Redmond, WA (US); Michael James Ahiakpor, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 15/047,595

(22) Filed: Feb. 18, 2016

(65) Prior Publication Data
US 2016/0173434 A1 Jun. 16, 2016

Related U.S. Application Data

(63) Continuation of application No. 13/250,664, filed on Sep. 30, 2011, now Pat. No. 9,292,600.

(51) Int. Cl.
*G06F 15/16* (2006.01)
*G06F 17/00* (2019.01)
(Continued)

(52) U.S. Cl.
CPC ............ *H04L 51/22* (2013.01); *G06F 3/0482* (2013.01); *G06F 3/04842* (2013.01);
(Continued)

(58) Field of Classification Search
CPC ..... G06F 13/337; G06Q 10/10; G06Q 10/107
See application file for complete search history.

(56) References Cited

U.S. PATENT DOCUMENTS 5,377,354 A 12/1994 Scannell et al.
5,940,478 A 8/1999 Vaudreuil et al.
(Continued)

FOREIGN PATENT DOCUMENTS

CN 101194283 6/2008
EP 1603066 12/2005
(Continued)

OTHER PUBLICATIONS

Premick, Justin, 2009, May, "Do Not Reply Address Don't Bother, Email Marketing Tips Delivered", https://blog.aweber.com/articles-tips/do-not-reply-address-dont-bother.htm (Year: 2009).*
(Continued)

*Primary Examiner* — Nicholas R Taylor
*Assistant Examiner* — Ho T Shiu

(57) ABSTRACT

Message management and classification techniques are described. In one or more implementations, a message received from a sender for delivery via a user account is examined to extract one or more features of the message. A determination is then made as to whether the message corresponds to one or more categories based on the extracted features, the categories usable to enable features to be applied to the message in a user interface.

20 Claims, 9 Drawing Sheets

(51) Int. Cl.

| | |
|---|---|
| *G06F 21/00* | (2013.01) |
| *G06Q 10/00* | (2012.01) |
| *H04L 29/06* | (2006.01) |
| *H04L 12/58* | (2006.01) |
| *G06F 16/28* | (2019.01) |
| *G06F 16/35* | (2019.01) |
| *G06Q 10/10* | (2012.01) |
| *G06F 3/0482* | (2013.01) |
| *G06F 3/0484* | (2013.01) |

(52) U.S. Cl.
CPC .......... *G06F 16/287* (2019.01); *G06F 16/353* (2019.01); *G06Q 10/107* (2013.01); *H04L 51/14* (2013.01)

(56) References Cited

U.S. PATENT DOCUMENTS

| | | | |
|---|---|---|---|
| 7,266,562 B2 | 9/2007 | Levine | |
| 7,299,261 B1 | 11/2007 | Oliver et al. | |
| 7,620,690 B1 | 11/2009 | Castelli | |
| 7,640,305 B1 | 12/2009 | Arthur et al. | |
| 7,644,127 B2 | 1/2010 | Yu | |
| 7,680,886 B1 | 3/2010 | Cooley | |
| 7,836,061 B1* | 11/2010 | Zorky ................... | G06F 16/353 707/749 |
| 7,899,871 B1 | 3/2011 | Kumar et al. | |
| 8,135,790 B1 | 3/2012 | Castelli | |
| 8,645,471 B2* | 2/2014 | Onyon ................. | G06Q 10/107 709/206 |
| 8,918,466 B2* | 12/2014 | Yu ........................... | H04L 51/12 709/206 |
| 2002/0029304 A1 | 3/2002 | Reynar et al. | |
| 2003/0009526 A1 | 1/2003 | Bellegarda et al. | |
| 2003/0195937 A1 | 10/2003 | Kircher et al. | |
| 2004/0003283 A1 | 1/2004 | Goodman et al. | |
| 2005/0015451 A1* | 1/2005 | Sheldon .................. | H04L 51/28 709/206 |
| 2005/0021637 A1 | 1/2005 | Cox | |
| 2005/0144245 A1 | 6/2005 | Lowe | |
| 2005/0228790 A1 | 10/2005 | Ronnewinkel et al. | |
| 2005/0243717 A1 | 11/2005 | Stieglitz et al. | |
| 2005/0262209 A1 | 11/2005 | Yu | |
| 2005/0267944 A1 | 12/2005 | Reeves, II | |
| 2006/0010209 A1 | 1/2006 | Hodgson | |
| 2006/0031328 A1 | 2/2006 | Malik | |
| 2006/0053279 A1 | 3/2006 | Coueignoux | |
| 2006/0265498 A1 | 11/2006 | Turgeman et al. | |
| 2006/0271631 A1 | 11/2006 | Qureshi et al. | |
| 2007/0005702 A1 | 1/2007 | Tokuda et al. | |
| 2007/0027992 A1* | 2/2007 | Judge .................... | G06Q 10/107 709/227 |
| 2007/0156886 A1 | 7/2007 | Srivastava | |
| 2008/0034045 A1 | 2/2008 | Bardsley | |
| 2008/0263156 A1 | 10/2008 | Costea et al. | |
| 2009/0006285 A1 | 1/2009 | Meek et al. | |
| 2009/0013375 A1 | 1/2009 | Macintosh et al. | |
| 2009/0064304 A1 | 3/2009 | Cohen et al. | |
| 2009/0254629 A1 | 10/2009 | Bruce et al. | |
| 2009/0254971 A1* | 10/2009 | Herz ................... | G06Q 30/0603 726/1 |
| 2009/0319377 A1 | 12/2009 | Gazetova et al. | |
| 2010/0070538 A1 | 3/2010 | Spinelli et al. | |
| 2010/0205259 A1 | 8/2010 | Vitaldevara et al. | |
| 2010/0208259 A1 | 8/2010 | Suzuki et al. | |
| 2010/0235447 A1 | 9/2010 | Goodman et al. | |
| 2010/0332428 A1* | 12/2010 | McHenry ............ | G06F 17/3071 706/12 |
| 2011/0010244 A1 | 1/2011 | Hatridge et al. | |
| 2011/0010433 A1 | 1/2011 | Wilburn et al. | |
| 2011/0022552 A1 | 1/2011 | Zimmerman et al. | |
| 2011/0022696 A1 | 1/2011 | Bardsley | |
| 2011/0131279 A1 | 6/2011 | Karnik | |
| 2011/0238767 A1 | 9/2011 | Murphy | |
| 2011/0246584 A1 | 10/2011 | Vitaldevara et al. | |
| 2011/0276563 A1 | 11/2011 | Sandoval et al. | |
| 2012/0005289 A1 | 1/2012 | Bardsley | |
| 2012/0042017 A1 | 2/2012 | Fried | |
| 2012/0110085 A1* | 5/2012 | Malik ................... | G06Q 10/00 709/205 |
| 2012/0246725 A1 | 9/2012 | Osipkov | |
| 2013/0018964 A1 | 1/2013 | Osipkov et al. | |

FOREIGN PATENT DOCUMENTS

| | | |
|---|---|---|
| JP | H09190447 A | 7/1997 |
| JP | 2005235206 A | 9/2005 |
| KR | 1020030074122 A | 9/2003 |
| KR | 1020070010644 A | 1/2007 |
| KR | 100975966 B1 | 8/2010 |
| KR | 1020110044830 A | 5/2011 |

OTHER PUBLICATIONS

"Office Action Issued in Japanese Patent Application No. 2014-533561", dated Jul. 19, 2016, 4 Pages. (w/o English Translation).

"Office Action Issued in Japanese Patent Application No. 2014-533561", dated Mar. 14, 2017, 4 Pages. (With/out English Translation).

"Final Rejection Issued in U.S. Appl. No. 13/250,664", dated Oct. 17, 2013, 15 Pages.

"Final Rejection Issued in U.S. Appl. No. 13/250,664", dated Aug. 14, 2014, 14 Pages.

"Final Rejection Issued in U.S. Appl. No. 13/250,664", dated Jul. 16, 2015, 21 Pages.

"Non-Final Rejection Issued in U.S. Appl. No. 13/250,664", dated Apr. 1, 2013, 13 Pages.

"Non-Final Rejection Issued in U.S. Appl. No. 13/250,664", dated Jan. 2, 2015, 17 Pages.

"Non-Final Rejection Issued in U.S. Appl. No. 13/250,664", dated Feb. 4, 2014, 15 Pages.

"Office Action Issued in China Patent Application No. 201210445137. 9", dated May 19, 2016, 13 Pages.

"International Search Report & Written Opinion Issued in PCT Application No. PCT/US12/54537", dated Feb. 26, 2013, 11 Pages.

"Category Actions for Outlook Categories", Retrieved From <<https://web.archive.org/web/20090730022627/http://www.veranosoft.com/Category-Actions.html>>, Jul. 10, 2009, 1 Page.

Ayodele, et al., "Email Classification and Summarization: A Machine Learning Approach", In Proceedings of the IET Conference on Wireless, Mobile and Sensor Networks, Dec. 12, 2007, 5 Pages.

Basu, Saikat, "MS Outlook Tip: How to Automatically Organize Incoming Emails", Retrieved From <<http://www.makeuseof.com/tag/ms-outlook-productivity-tip-how-to-move-emails-to-individual-folders-automatically/>>, Sep. 27, 2009, 6 Pages.

Heathers, Ryan, "Notes on Productivity", Retrived From <<http://www.notesonproductivity.com/ICA/NOP.nsf/dx/hey-gmail-lotus-notes-did-it-first>>, Sep. 2, 2010, 5 Pages.

Koren, et al., "Automatically Tagging Email by Leveraging Other Users' Folders", Retrieved at <<http://users.cis.fiu.1 edu/-lzhen001/activities/KDD2011 Program/docs/p913.pdf>>, Proceedings of the 17th ACM SIGKDD international conference on Knowledge discovery and data mining, Aug. 21-24, 2011, pp. 913-921.

Yih, et al., "Improving Spam Filtering by Detecting Gray Mail", Retrieved at <<http://citeseerx.ist.psu.edu/viewdoc/download?doi=10.1.1.73.2373&rep=rep1 &type=pdf>>, Fourth Conference on Email and Anti-Spam, Aug. 2-3, 2007, pp. 4.

"Foreign Office Action", CN Application No. 201210445137.9, dated Feb. 12, 2015, 16 pages.

"Extended European Search Report", EP Application No. 12834686. 3, dated Apr. 21, 2015, 6 pages.

"Second Office Action and Search Report Received for Chinese Patent Application No. 201210445137.9", dated Nov. 17, 2015, 16 Pages.

"Office Action Issued in Korean Patent Application No. 10-2014-7008417", dated Jan. 7, 2019, 6 Pages.

(56) References Cited

OTHER PUBLICATIONS

"Office Action Issued in European Patent Application No. 12834686.3", dated Feb. 26, 2019, 6 Pages.
"Office Action Issued in Korean Patent Application No. 10-2014-7008417", dated Oct. 31, 2018, 6 Pages.
"First Office Action Issued in Chinese Patent Application No. 201710073312.9", dated Mar. 12, 2020, 16 Pages.
"Summons to Attend Oral Proceedings Issued in European Patent Application No. 12834686.3", Mailed Date: Jul. 13, 2020, 8 Pages.
"Office Action Issued in Korean Application No. 10-2014-7008417", dated Apr. 26, 2018, 19 Pages.
"Second Office Action and Search Report Issued in Chinese Patent Application No. 201710073312.9", dated Oct. 30, 2020, 17 Pages.

* cited by examiner

MESSAGE CLASSIFICATION AND MANAGEMENT

RELATED APPLICATIONS

This application is a continuation of and claims priority to U.S. patent application Ser. No. 13/250,664, entitled "Message Classification and Management," filed on Sep. 30, 2011, and which is incorporated by reference in its entirety.

BACKGROUND

The amount of messages with which a typical user may interact in a given day is ever increasing. For example, a user may receive a multitude of emails that vary in an amount of importance to a recipient of the emails. The user, for instance, may receive work emails and personal emails in an account. The user may also receive emails that are sent periodically from a sender that may have varying degrees of interest to the user, such as newsletters, offers for sale, and so on.

However, traditional techniques that were employed to interact with the emails generally did not differentiate between these emails. Consequently, a user was often forced to navigate through each of the emails using traditional techniques to locate a particular email of interest, which could be both time consuming and frustrating to the user especially when considering the vast number of emails and other messages even a typical user may receive in a day.

SUMMARY

Message management and classification techniques are described. In one or more implementations, a message received from a sender for delivery via a user account is examined to extract one or more features of the message. A determination is then made as to whether the message corresponds to one or more categories based on the extracted features, the categories usable to enable functionality to be applied to the message in a user interface.

In one or more implementations, a message and data indicating a category as classified by a network service that maintains a user account through which the message is communicated is received by a client device. The category is based on an examination of the message by the network service. A user interface is configured to display the message based on the category.

In one or more implementations, a communication is formed for delivery to a client device that is configured to access a user account of the network service, the communication including a message and data indicating a category for the message as classified by a network service based on an examination of the message by the network service. Feedback is received from the client device that describes interaction with the message and one or more techniques usable to perform the classification by the network service are adjusted based on the received feedback.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users have access to a variety of different messages. However, some of these messages may have varying degrees of importance to the user. For example, a user may receive "graymail" that may be of less interest to some users than others, such as newsletters and event-related messages. Consequently, this graymail may hinder a user's interaction with other messages that have an increased likelihood of being of interest to the user, such as person-to-person messages.

Message classification and management techniques are described. In one or more implementations, messages may be classified into a corresponding category that may be used to aid subsequent treatment of the message. For example, a network service (e.g., an email service) may classify a message into a category based on an examination of the message. A newsletter category, for instance, may be classified based on existence of an "unsubscribe" feature in the message. The message and the data indicating the category may then be leveraged by the network service in configuration of a user interface for a client device.

For example, the client device may output a user interface indicating categories and in which the message is filed under a corresponding category. The user interface may also support rules that are written for specific categories, such as how to treat messages from a particular sender having a particular category. Other functionality may also be supported as further described in the following sections.

Further, feedback may be provided back to the network service from the client device. The feedback, for instance, may describe user interaction with the messages, messages in particular categories, and so on, which may be used to adjust how messages are classified. For example, a user may reclassify a particular message from a "newsletter" to "person-to-person" message (e.g., "regular" email). Data describing this reclassification may then be sent to the network service for use in subsequent processing, such as to adjust one or more models used to perform the classification. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
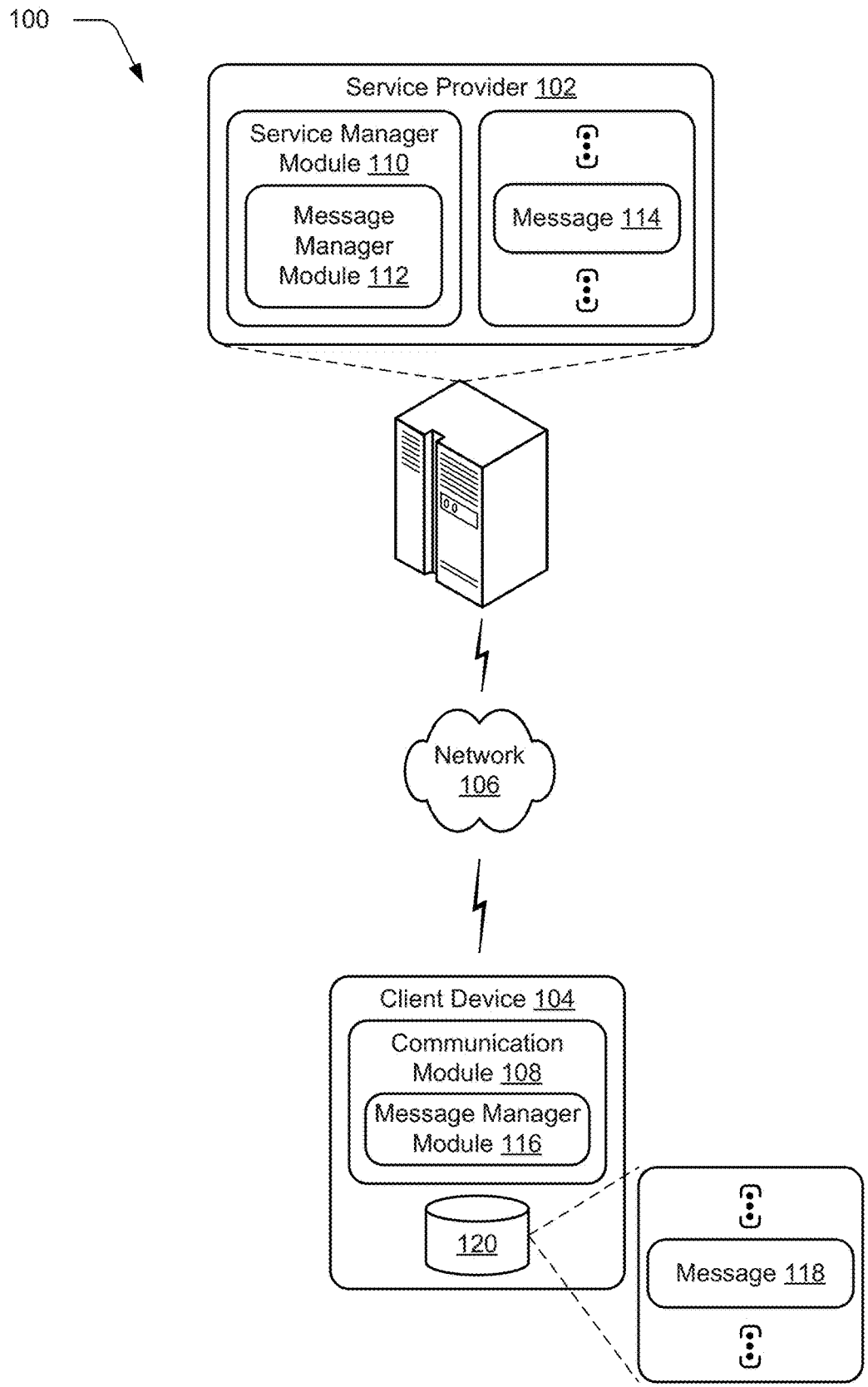
FIG. 1 is an illustration of an environment in an example implementation that is operable to employ message classification and management techniques.

FIG. 1 is an illustration of an environment 100 in an example implementation that is operable to employ techniques described herein. The illustrated environment 100 includes a service provider 102 that is communicatively coupled to a client device 104 via a network 106. The service provider 102 and the client device 104 may be implemented using a wide variety of computing devices.

For example, a computing device may be configured as a computer that is capable of communicating over the network 106, such as a desktop computer, a mobile station, an entertainment appliance, a set-top box communicatively coupled to a display device, a wireless phone, a game console, a server, and so forth. Thus, the computing device may range from full resource devices with substantial memory and processor resources (e.g., servers, personal computers, game consoles) to a low-resource device with limited memory and/or processing resources (e.g., traditional set-top boxes, hand-held game consoles). Additionally, although a single computing device is shown (e.g., a server for the service provider 102), the computing device may be representative of a plurality of different devices, such as multiple servers utilized by a business to perform operations (e.g., a server farm), a remote control and set-top box combination, an image capture device and a game console configured to capture gestures, and so on.

A computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client device 104 is further illustrated as including a communication module 108. The communication module 108 is representative of functionality of the client device 104 to communicate via the network 106, such as with the service provider 102. For example, the communication module 108 may incorporate browser functionality to navigate the network 106, may be configured as a dedicated application having network access functionality, and so on.

The service provider 102 is illustrated as including a service manager module 110, which is representative of functionality to provide and manage access to one or more network services via the network 106. The service manager module 110, for instance, may incorporate revenue techniques to collect revenue for provision of the service, such as directly (e.g., for a fee), on a subscription basis, indirectly through inclusion of one or more advertisements, and so on.

One example of a service is illustrated through inclusion of a message manager module 112. The message manager module 112 is representative of functionality of the service provider 102 to manage communication of one or more messages 114. The messages 114, for instance, may be formed through interaction with the message manager module 112 by the client device 104 for communication to another user via a user account.

The messages 114 may also be representative of messages received by the service provider 102 to be communicated via user accounts associated with the service provider 102. The service provider 102, for instance, may receive a message 114 from another service provider and store that message in association with a user account. A user may then access the user account of the service provider 102 to gain access to the message 114, such as by using the communication module 108 of the client device 104. A variety of different messages 114 may be managed by the service provider 102, such as emails, SMS, MMS, instant messages, and other messages capable of being communicated electronically via the network 106. Because analysis may be performed by the message manager module 112 as part of a network service, the module may obtain a global view of messages sent to a multitude of users, which may be used to detect situations that may be difficult in single accounts, such as campaign detection.

Functionality of the message manager module 112, however, is not limited to implementation by the service provider 102. As such, the message manager module may be implemented by a variety of different entities, such as a third-party entity, by the client device 104 itself which is illustrated as inclusion of a message manager module 116 to manage messages 118 in storage 120 that is local to the client device 104, and so on. Therefore, although operation of the message manager module 112 is described at the service provider 102, this operation is not so limited and may be distributed throughout the environment 100 as well as other environments.

The message manager module 112 may manage the messages 114 in a variety of ways. For example, the message manager module 112 may be utilized to classify messages 114 into respective categories. The categories may then be leveraged to improve user interaction with the messages 114 by the client device 104, further discussion of which may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
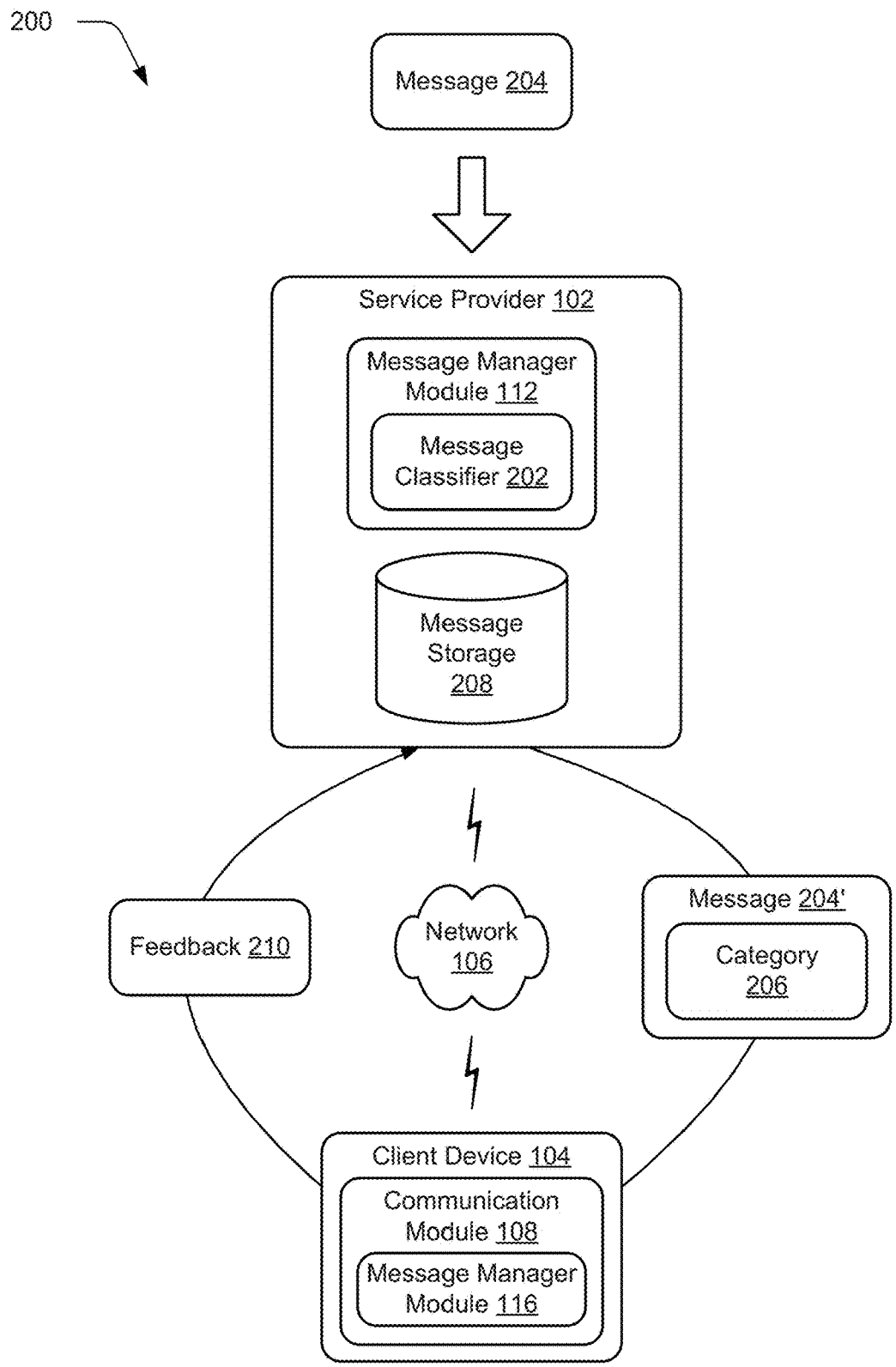
FIG. 2 is an illustration of a system in an example implementation showing a client device of FIG. 1 as receiving a message that has been classified by a service provider.

FIG. 2 is an illustration of a system 200 in an example implementation showing the client device 104 of FIG. 1 as receiving a message that has been classified by the service provider 102. Graymail may involve a significant portion of the unwanted message traffic received by typical users. As previously described, graymail may be thought of as messages that have varying degrees of interest for different users. Also, graymail was typically not addressed using traditional deterministic actions that were performed for spam filtering, e.g., to block delivery.

Accordingly, a system 200 is illustrated that incorporates techniques for classifying, filtering, and managing messages. For example, the system 200 may include a message classifier 202 that is representative of functionality to examine and classify messages 204. The system also includes a mechanism for storage and retrieval of the category 206 labels associated with a message 204', which is illustrated as message storage 208. For example, the message 204' may be associated with one or more categories that may be used to manage interaction with the message 204'.

The system 200 may also be configured to support a set of user-configurable functionality and interfaces to control the retention, display, sorting, and subscriptions of and to labeled messages. Further, the system 200 may leverage feedback 210 from a user of the client device 104, such as to support a machine-learning training system that automatically updates the classification performed by the message classifier 202.

For example, the message manager module 112 may receive a message 204, such as from another network service, through inputs received from another user of the service provider 102 (i.e., composed through interaction with the service provider 102), and so on.

The message classifier 202 may then be used to classify the message 204, to a category, if relevant. The message classifier 202, for instance, may utilize a machine-learning-based classification model, e.g., the message 204 either belongs to a given category or it does not based on a threshold. A variety of different categories may be supported, such as a newsletter a transaction, a travel document, a social network, an electronic card, dating site messages, financial news, material that is unsafe for children, transactions, targeted advertisements based on types of messages received, or a receipt, and so on. Further, it should be appreciated that a single message may be categorized into a plurality of different categories.

Regarding newsletters, for instance, the message classifier 202 (which may be implemented by message manager module 112, message manager module 116, or elsewhere as previously described) may be trained initially on a set of messages classified by humans into "newsletter" and "not newsletter" categories. A binary classification model may then be created to discern between the two labeled sets of messages and recreate the human grading result. The degree to which a model correctly identifies the category (e.g., newsletters) may be referred to as a "catch rate" and the degree to which the classification is wrong may be measured by metrics, e.g., false negatives (FN) and false positives (FP). A false negative refers to an instance in which a model utilized by the message classifier 202 labeled a newsletter as "not newsletter" and a false positive is the opposite, e.g., a message in the "not newsletter" category was mistakenly labeled "newsletter."

The models incorporated by the message classifier 202 may make this determination based on an examination of the message 204 to identify features that may be indicative of different categories. Additionally, the message classifier 202 may incorporate the outcomes of a plurality of different models into the final classification decision, e.g., through voting and other techniques. Thus, accuracy of the message classifier 202 may be improved by using a plurality of individual models trained on disjoint feature sets.

For a newsletter category, for instance, the message classifier 202 may look at a variety of different features. These features may include whether the message 204 includes an admonition "do not reply," includes an indication that the message 204 includes an "unsubscribe" feature through a setting in a header of the message 204, whether a body of the message 204 itself includes text and/or links indicative of an unsubscribe feature, and so on. The message classifier 202 may also take into account such features as a sender's email address and a corresponding reputation of the sender.

Content training may also be incorporated, such as to extrapolate patterns through training that are indicative of a newsletter. For example, features indicative of a newsletter may include a plurality of links, formatting incorporated in a body of the message 204, arrangement of words or phrases, one-way communication, number of specified recipients, degree of recipient interest (e.g., a high percentage of unread messages), unsubscribe features, non-personalized content, and so forth. A variety of other examples are also contemplated both for the newsletter category itself as well as for other categories. For example, features may be used to identify a confirmation through a confirmation code, a receipt through transaction information, a social network message through inclusion of a status update, and so forth.

The message 204' having the category 206 (which may be representative of one or more categories) may then be maintained in message storage 208 for subsequent access by the client device 104, may be classified and communicated as requested by the client device 104, and so on. A user interface to be output by the client device 104 may then be configured based on the category 206 of the message 204'. For example, the message manager module 112 may identify the category 206 from the message 204', which in this example is a newsletter and configure an user interface for access by the communication module 108 having functionality that is exposed for that category 206 for interaction by a user of the client device 104.

Figure 3:
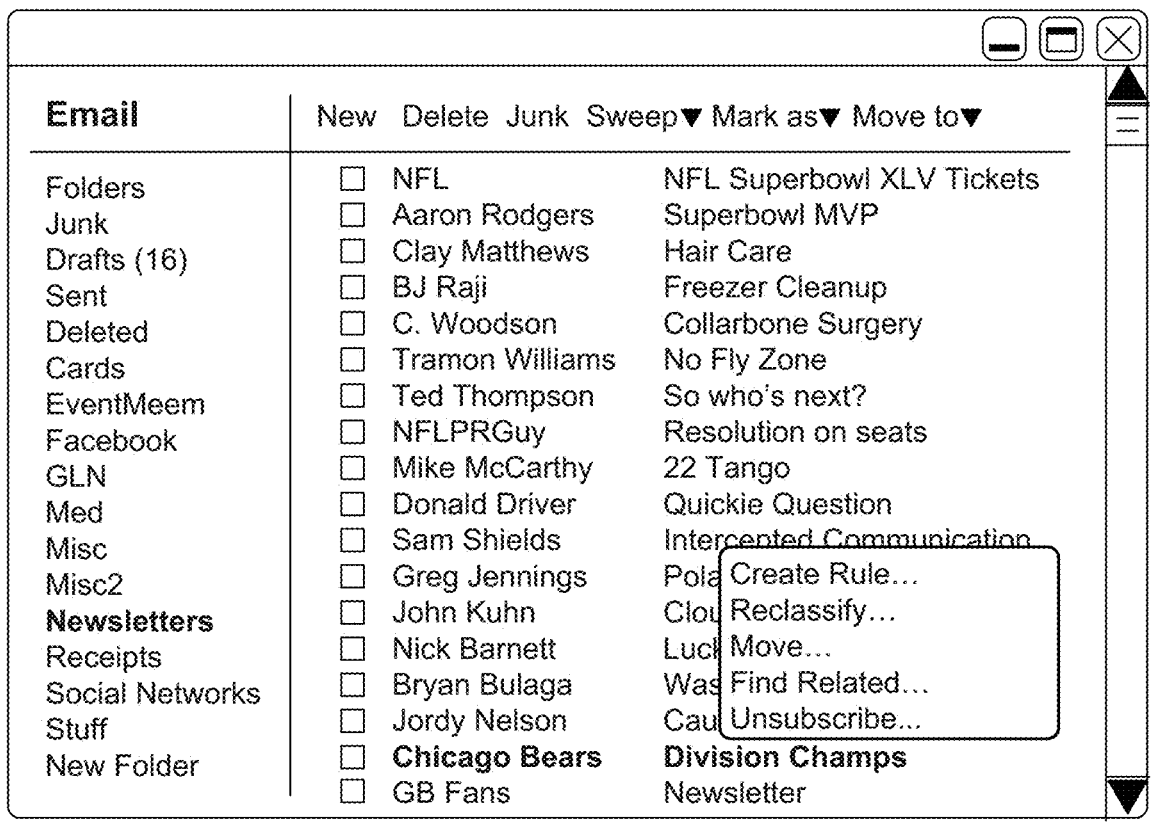
FIG. 3 is an illustration of a user interface as outputting functionality in response to classification of a message.

In one example of such functionality, the user interface may be configured to allow a user to view and modify the category 206 associated with the message 204'. This mechanism may also be used to support feedback 210 as further described below. As shown in FIG. 3, for instance, a user interface 300 is output that includes outputs of newsletters in a newsletter folder. A newsletter for the Chicago Bears is shown as selected and a menu is output that includes a plurality of options that may be used in relation to that message. One example of which is a "create rule" option in which a rule may be created that is specific to the category, e.g., to delete newsletters from a particular sender. Thus, this rule may be configured to delete the messages in that category (e.g., newsletter) but let other messages in other categories "through."

Another such example of functionality is illustrated as "reclassify" which may allow a user to reclassify a message, which may support a feedback 210 as previously described. Other such functionality includes "move" and "find related" which may be used to move the message to a different folder, find related messages, and so on.

The user interface 300 may also include functionality to allow a user to unsubscribe from the subsequent receipt of newsletters from a sender. For example, a user may select the unsubscribe feature. The message manager module 112 may then initiate steps to stop receipt of further newsletters from that sender.

For example, previous unsubscribe mechanisms typically took the user out of a browser session and corresponding user experience with the service provider 102 into a different browser session to interact with a third-party web site (usually that of the newsletter sender) to complete the unsubscribe action. However, the message manager module 112 may output a managed experience whereby this function is performed opaquely by leveraging metadata embedded in the message 204'. The message manager module 112, for instance, may attempt communication using one or more links included within the message, automatically reply with "unsubscribe" in a header of a message, and so on.

Figure 4:
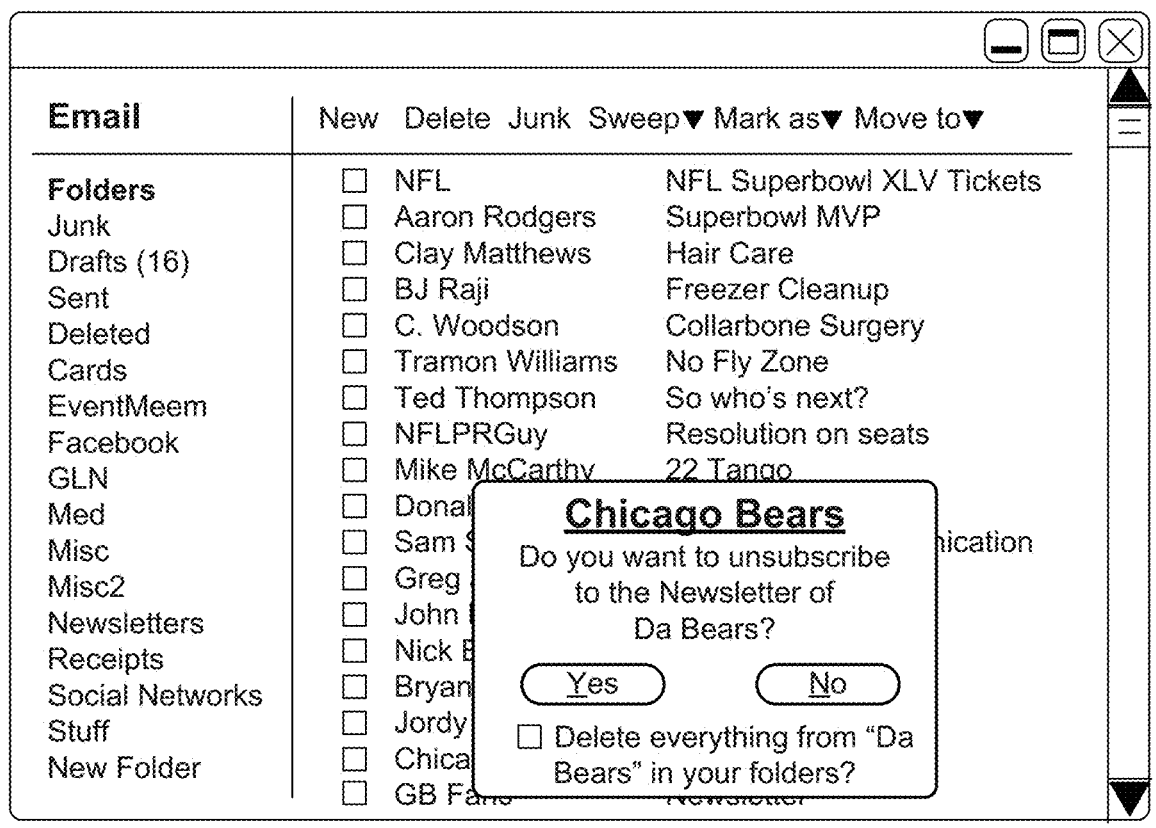
FIG. 4 is an illustration of a user interface as outputting an option to unsubscribe to a sender of a message.

When that metadata is not available, the communication module 108 may surface a user interface 400 generated by the message manager module 112 such that a user may interact with the sender to unsubscribe from receipt of future messages as shown in FIG. 4. In this user interface 400, a pop-up window is output via which a user may interact with a sender of the message, such as to confirm that the user wishes to unsubscribe from the newsletter. Thus, in this example, the user is not "navigated away" from a current browser session to interact with the service provider 102.

If either option is not available, the message manager module 112 may cause subsequent messages to be blocked from that sender, e.g., by automatically configuring a rule to do so. In one or more implementations, this blocking may be performed even in an instance in which the other two options are available to prevent receipt of subsequent messages in the interim before the sender complies with the unsubscribe request. This may also address instances in which the sender is untrustworthy to actually implement the unsubscribe operation.

Selection of these options may also cause output of another option to remove remaining messages from the sender, e.g., newsletters that were received by the user account previously as shown in the user interface 400 of FIG. 4. Thus, selection of this option may be used to "clean up" the inbox of the user account from this and other messages.

Thus, these techniques may be an improvement over traditional mechanisms which recommended that the user take actions that may not be understand or even capable of being completed by the user. These techniques may also help to reduce a likelihood that the user is exposed to malicious parties, e.g., reputation information may be utilized to determine whether to permit a link to a sender or just to block messages from that sender without communicating with the sender. For example, this may be based on a senders IP address, sender's ID records, DKIM, embedded URLS, and so on.

Further, these techniques may also support feedback. For example, data describing user interaction with the messages (e.g., reclassification, movement, read vs. unread, and so on) may be leveraged by the message classifier 202. This information may thus provide a "signal" that is usable to the training system of the message classifier 202 which may be used to adjust the detection characteristics of each model. This may include adjusting a particular model, weight given to one model versus another model, and so on. Thus, the message classifier 202 may learn from the user interaction and adjust accordingly.

Although newsletters were described, these functions are generic and can be applied to any kind of categorized content such as social media notifications, transactional messages such as receipts/confirmations, and so on as previously described. Further discussion of message classification, management, user interfaces, and feedback may be found in relation to the following procedures.

Example Procedures

The following discussion describes message techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 5:
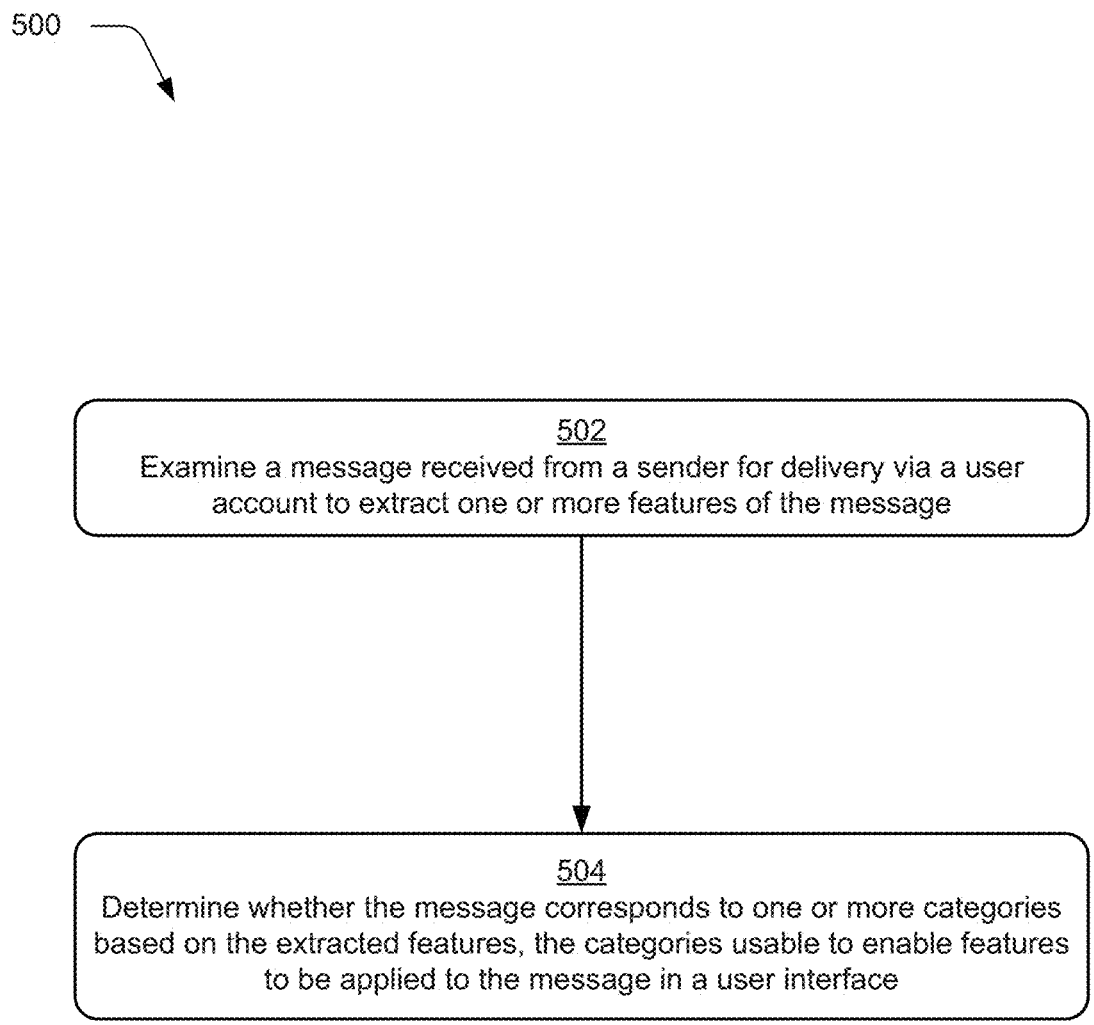
FIG. 5 is a flow diagram depicting a procedure in an example implementation in which a message is examined to extract features usable to determine a category for the message.

FIG. 5 depicts a procedure 500 in an example implementation in which a message is examined to extract features usable to determine a category for the message. A message received from a sender for delivery via a user account is examined to extract one or more features of the message (block 502). As described above, a variety of different features may be extracted which may be indicative of membership in a particular category. For a newsletter, features may be extracted such as whether the message includes functionality to unsubscribe, exclusion of forwards and replies (e.g., which are indicative of standard person-to-person messages), instructions not to respond to the message, based on patterns identified through machine learning, and so forth.

A determination is then made as to whether the message corresponds to one or more categories based on the extracted features, the categories usable to expose functionality to be applied to the message in a user interface (block 504). Continuing with the previous example, the message manager module 112 may determine that the message 204 corresponds to a newsletter category. The message manager module 112 may then configure a user interface to expose functionality that is particular to that category. The functionality, for instance, may be in addition to functionality that is made available to standard person-to-person messages, such as to provide an ability to unsubscribe, options to delete this message, block future messages, and delete past messages from a sender for that particular category with a single selection, an option that is selectable to view each message in the category regardless of which folder contains the message, and so forth. Additional examples may be found in relation the following section.

Figure 6:
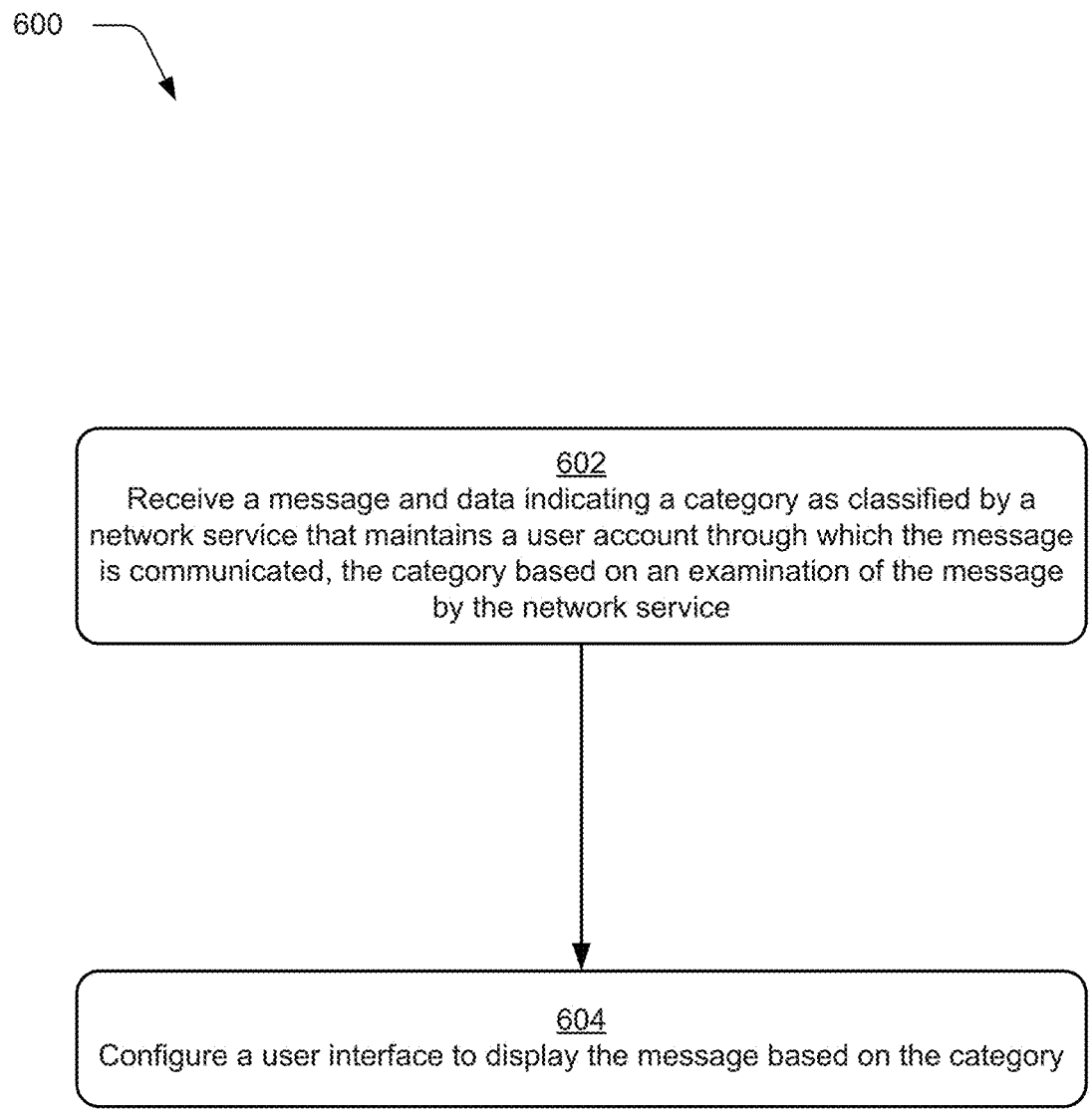
FIG. 6 is a flow diagram depicting a procedure in an example implementation in which a user interface is configured based on a classification of a message.

FIG. 6 depicts a procedure 600 in an example implementation in which a user interface is configured based on a classification of a message. A message and data indicating a category as classified by a network service that maintains a user account through which the message is communicated is received by a client device. The category is based on an examination of the message by the network service (block 602). As before, the classification into particular categories may be based on a variety of features.

A user interface is configured to display the message based on the category (block 604). As above, the message may be "filed" in a corresponding category by the message manager module 112 automatically and without user intervention and thus "clean up" an inbox of a user, may expose functionality that is based on the particular category, and so forth. Interaction with the message may also be used to support feedback as further described in the following figure.

Figure 7:
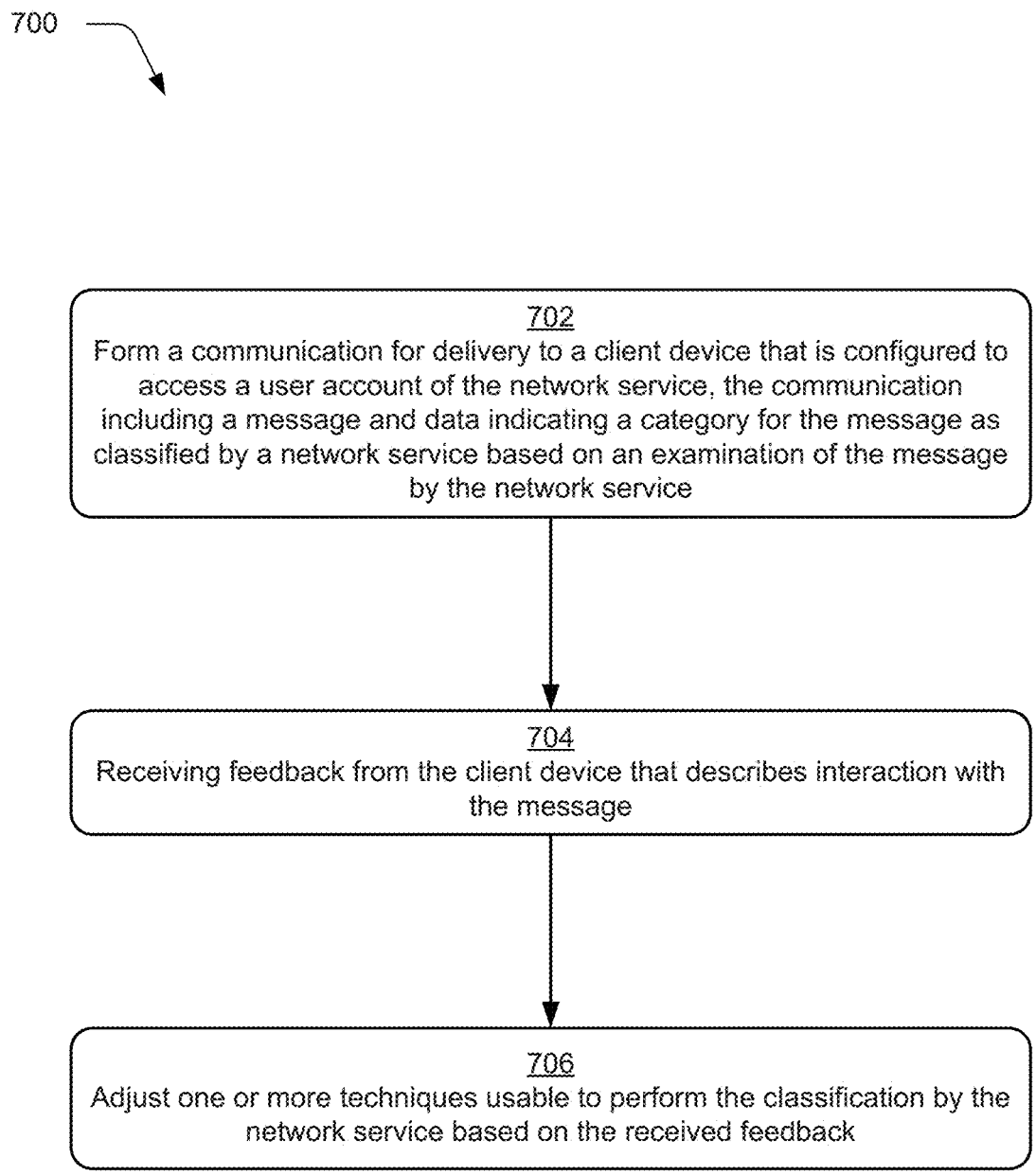
FIG. 7 is a flow diagram depicting a procedure in an example implementation in which feedback is provided based on monitored interaction with a message.

FIG. 7 is a flow diagram depicting a procedure in an example implementation in which feedback is provided based on monitored interaction with a message. A communication is formed for delivery to a client device that is configured to access a user account of the network service, the communication including a message and data indicating a category for the message as classified by a network service based on an examination of the message by the network service (block 702). The communication, for instance, may be configured as a user interface that is configured based on the category 206 of the message 204' for output by the communication module 108.

Feedback is received from the client device that describes interaction with the message and one or more techniques usable to perform the classification by the network service are adjusted based on the received feedback (block 704). The feedback, for instance, may describe whether a user reclassified the message, e.g., to resolve false positives or negatives. The feedback may also describe whether the user interaction is more indicative of one category than another. For example, if a message is classified as a newsletter and a confirmation the confirmation may be given priority based on how the user interacts with the message. This feedback may then be used to adjust techniques used to classify the message, e.g., parameters used by models, weighting between models, and so on. A variety of other examples are also contemplated.

Communication Techniques

The following provides further examples of the communications techniques that may be employed to deliver a message to a client device 104 as well as transmit the message by the client device 104.

Instant Messaging

Instant messaging is a popular text-based communication tool that enables two or more users to exchange messages via a network during an instant messaging session. When two users are online at the same time, for instance, instant messages may be exchanged in real time between the two users. Thus, the instant messages may be utilized to support a text conversation between the two users in a manner that mimics how the two users would participate in a typical spoken conversation.

Instant messaging is typically based on clients that facilitate connections between specified known users. Often, these known users can be associated with a "buddy list" or "contact list." Although instant messaging is text-based, instant messaging may include additional features such as audio and/or video. For example, during an instant messaging session, users can see each other by using webcams or other video cameras, and/or hear each other using microphones and speakers.

In an implementation, instant messaging (IM) modules communicate with each other through use of one or more of a plurality of service providers. A service provider, for instance, may include an IM manager module, which is executable to route instant messages between the IM modules. For example, a client may cause the IM module to form an instant message for communication to a recipient. The IM module is executed to communicate the instant message to the service provider, which then executes the IM manager module to route the instant message to the recipient over the network. The recipient receives the instant message and executes the IM module to display the instant message.

Clients can also be communicatively coupled directly, one to another (e.g., via a peer-to-peer network). If so, the instant messages are communicated without utilizing the service provider.

SMS/MMS

Short Messaging Service (SMS) is communication tool that allows an exchange of short text messages between a fixed line or mobile phone device and fixed or portable devices over a network. Unlike instant messaging, SMS messages can be transmitted without both the sender and receiver being simultaneously online. SMS messages may be sent to a Short Message Service Center (SMSC), which may provide a store and forward mechanism. The SMSC may then attempt to send the SMS messages to intended recipients. If a recipient cannot be reached, the SMSC may queue the SMS message and retry at a later time. Some SMSCs, however, may provide a forward and forget option where transmission is attempted only once. Both senders and recipients of SMS messages may be identified by a phone number associated with the device being used to send or receive the SMS message.

In addition to text, SMS techniques have been expanded to include Multimedia Messaging Service (MMS) which allows the exchange of multimedia content along with the short text messages. Multimedia content may include digital photographs, videos, and the like. Similar to SMS messages, MMS messages may identify senders and recipients by their respective phone numbers.

Although MMS messages are similar to SMS messages, MMS messages are delivered in an entirely different way. For example, the multimedia content in the MMS message is first encoded in a manner similar to a Multipurpose Internet Mail Extension (MIME) email. The encoded MMS message is then forwarded to a Multimedia Messaging Service Carrier (MMSC), which is a carrier's MMS store and forward server. If the intended recipient is associated with a different carrier, the MMSC may forward the encoded message to the recipient's carrier using the Internet.

Once the MMSC has received the message, it may determine whether the recipient's device is configured to receive an MMS message. If the recipient's device is MMS capable, then the content is extracted and sent to a temporary storage server with a Hypertext Transfer Protocol (HTTP) front-end. An SMS control message containing a Uniform Resource Locator (URL) of the MMS content may then be sent to the recipient's device to trigger the recipient device's Wireless Access Protocol (WAP) browser to open and receive the MMS content from the URL. If, however, the recipient device does not support MMS messages, the MMSC may attempt to modify the MMS content into a format suitable for the recipient device before sending the MMS content to the recipient device.

Electronic Mail

Electronic mail, commonly referred to as email or e-mail, is a communication tool for exchanging digital messages from an author to one or more recipients over a network. A user can send an email message through his or her email program, which sends the email message to a mail server.

The mail server may then forward the email message to another mail server or to a message store on the same mail server to be forwarded later. Unlike instant messages or SMS/MMS messages, email messages may identify senders and recipients by addresses including user names and domain names.

Email messages include an envelope, a header, and a body. The header may include fields that have names and values. Some example fields include From, To, CC, Subject, Date, and other information about the email message. The body may include basic content of the email message, as unstructured text, and may also include a signature block. The envelope is used to store communication parameters for delivery of the email message.

Email is one of the protocols included with the Transport Control Protocol/Internet Protocol (TCP/IP) suite of protocols. An example popular protocol for sending email is Simple Mail Transfer Protocol (SMTP), whereas example popular protocols for receiving emails include Post Office Protocol 3 (POP3) and/or Internet Message Access Protocol (IMAP). TCP/IP can be used as a communication language or protocol of the Internet, an intranet, or extranet. When an email message is sent over a network, the TCP manages assembly of the message or file into smaller packets, also referred to as "packetizing" the message. These packets are transmitted over the network, such as the Internet, and received by a TCP layer that reassembles the packets into the original message. The IP layer handles the address portion of each packet to ensure that each packet reaches the correct destination.

Web Service

Electronic messages may also be sent and received via a web service. A web service may include a software system designed to support interoperable machine-to-machine interaction over a network. Implementations of web services include web-based email services and/or web-based IM services. Web based services may include Extensible Markup Language (XML) messages that follow a Simple Object Access Protocol (SOAP) standard. Other web services may include Web Application Programming Interfaces (Web API), which may include a set of HTTP request messages along with a definition of the structure of response messages.

Web services may be used in a number of ways. Some example uses include Remote Procedure Calls (RPC), Service-Oriented Architecture (SOA), and Representational State Transfer (REST).

Example System and Device

Figure 8:
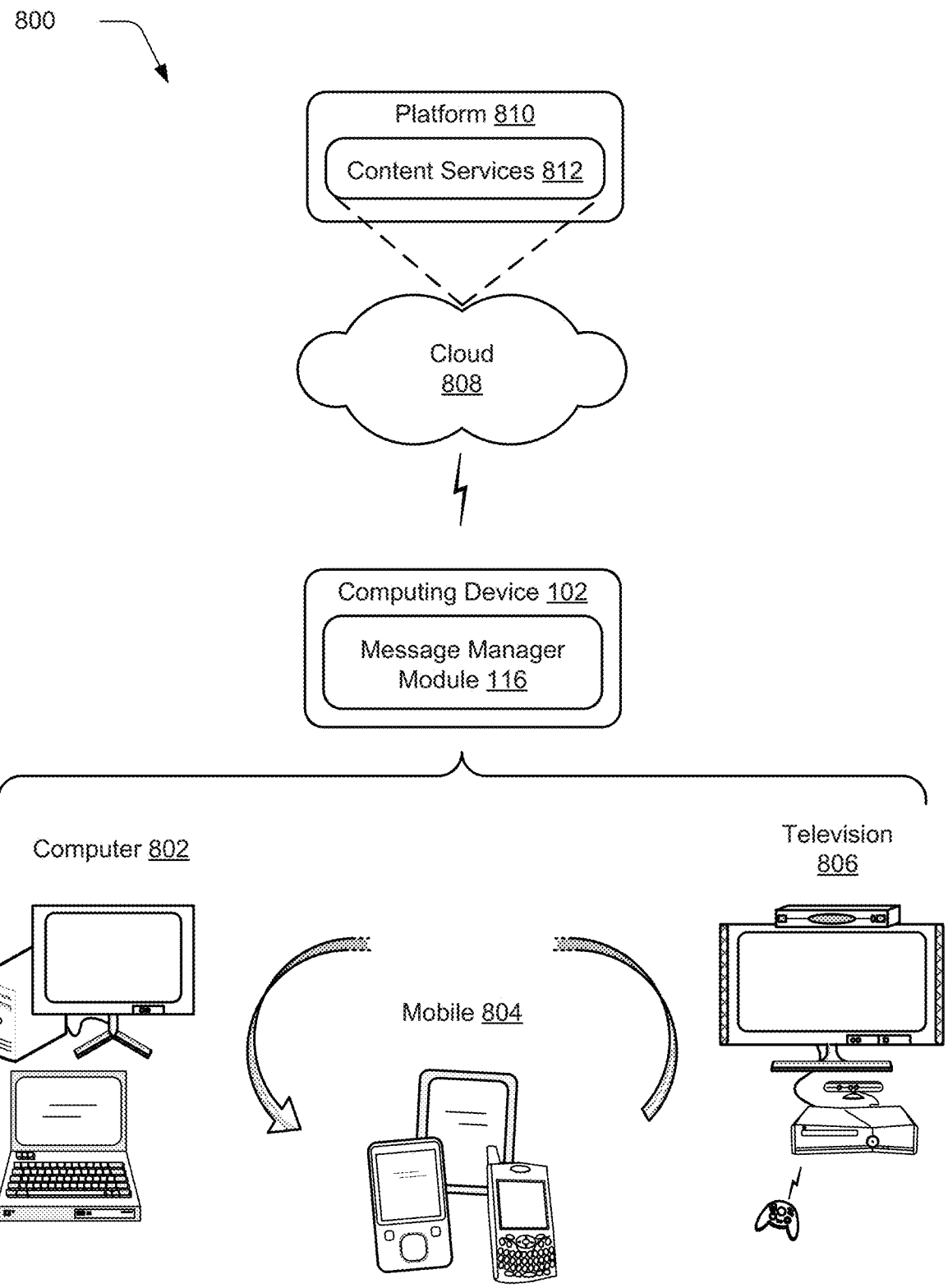
FIG. 8 illustrates an example system that includes the computing device as described with reference to FIG. 1.

FIG. 8 illustrates an example system 800 that includes the computing device 102 as described with reference to FIG. 1. The example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 802, mobile 804, and television 806 uses. Each of these configurations includes devices that may have generally different constructs and capabilities, and thus the computing device 102 may be configured according to one or more of the different device classes. For instance, the computing device 102 may be implemented as the computer 802 class of a device that includes a personal computer, desktop computer, a multi-screen computer, laptop computer, netbook, and so on.

The computing device 102 may also be implemented as the mobile 804 class of device that includes mobile devices, such as a mobile phone, portable music player, portable gaming device, a tablet computer, a multi-screen computer, and so on. The computing device 102 may also be implemented as the television 806 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. Further, these techniques may be distributed "over the cloud" as described below.

The cloud 808 includes and/or is representative of a platform 810 for content services 812. The platform 810 abstracts underlying functionality of hardware (e.g., servers) and software resources of the cloud 808. The content services 812 may include applications and/or data that can be utilized while computer processing is executed on servers that are remote from the computing device 102. Content services 812 can be provided as a service over the Internet and/or through a subscriber network, such as a cellular or Wi-Fi network.

The platform 810 may abstract resources and functions to connect the computing device 102 with other computing devices. The platform 810 may also serve to abstract scaling of resources to provide a corresponding level of scale to encountered demand for the content services 812 that are implemented via the platform 810. Accordingly, in an interconnected device embodiment, implementation of functionality of the functionality described herein may be distributed throughout the system 800. For example, the functionality may be implemented in part on the computing device 102 as well as via the platform 810 that abstracts the functionality of the cloud 808.

Figure 9:
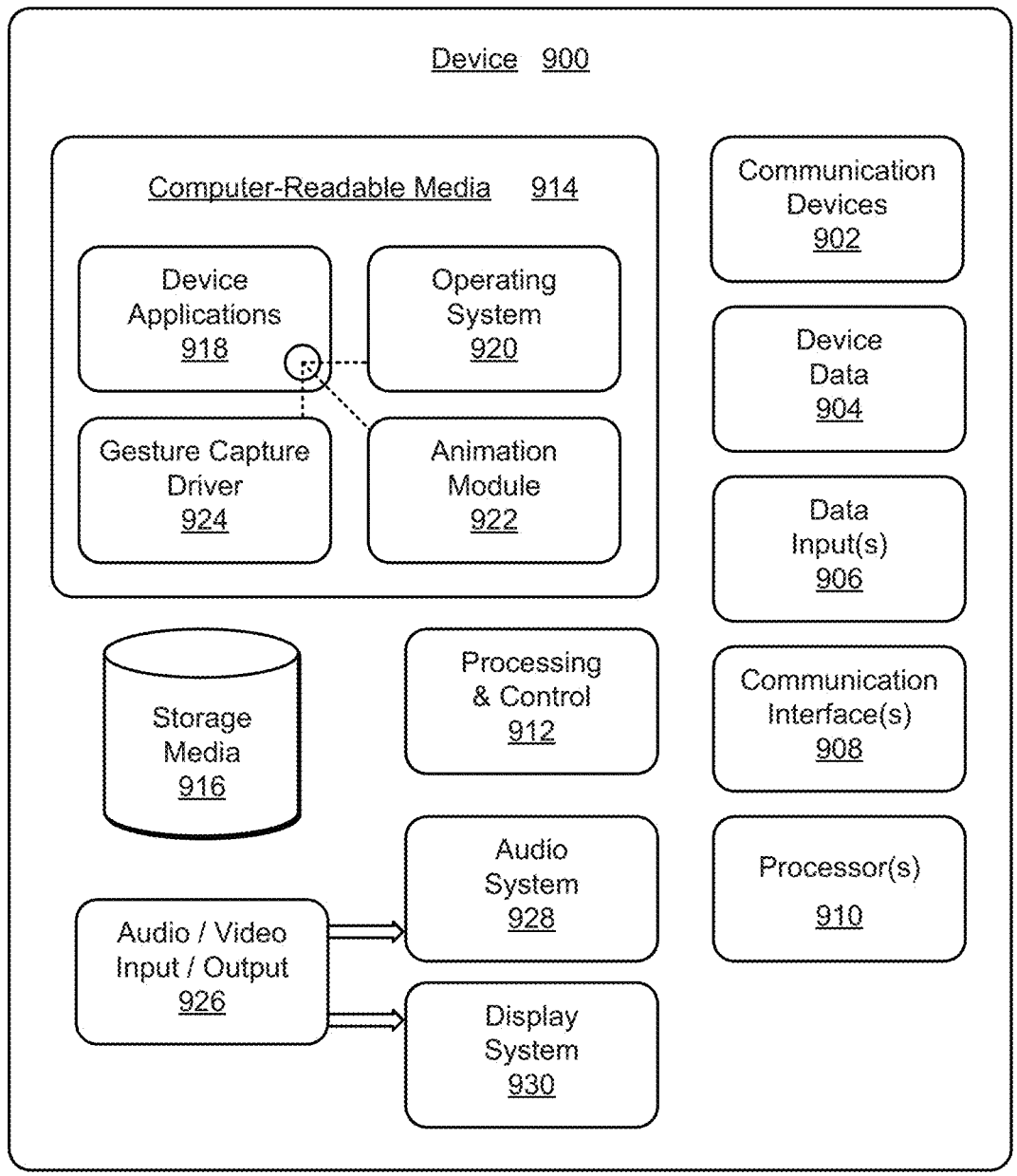
FIG. 9 illustrates various components of an example device that can be implemented as any type of computing device as described with reference to FIGS. 1, 2, and 8 to implement embodiments of the techniques described herein.

FIG. 9 illustrates various components of an example device 900 that can be implemented as any type of computing device as described with reference to FIGS. 1, 2, and 8 to implement embodiments of the techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments of the techniques described herein. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the techniques described herein. In this example, the device applications 918 include an interface application 922 and an input/output module 924 that are shown as software modules and/or computer applications. The input/output module 924 is representative of software that is used to provide an interface with a device configured to capture inputs, such as a touchscreen, track pad, camera, microphone, and so on. Alternatively or in addition, the interface application 922 and the input/output module 924 can be implemented as hardware, software, firmware, or any combination thereof. Additionally, the input/output module 924 may be configured to support multiple input devices, such as separate devices to capture visual and audio inputs, respectively.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing apparatus comprising:
one or more computer readable storage media;
a processing system operatively coupled with the one or more computer readable storage media; and
program instructions stored on the one or more computer readable storage media that, when executed by the processing system, direct the processing system to at least:
categorize, based on one or more features of a message, the message into a first category and a second category that is distinguished from the first category;
responsive to determining that the message corresponds to the first category and the second category, generate a user interface comprising:
a first functionality, based at least on a threshold of the first category, selectable for implementation; and
a second functionality, based at least on a threshold of the second category that is distinguished from the threshold of the first category, selectable for implementation;
responsive to a selection associated with the message, enable display of the user interface; and
responsive to a selection of the first functionality, implement the first functionality only in the first category.

2. The computing apparatus of claim 1 wherein the program instructions further direct the processing system to categorize the message to the first category further based on content training that extrapolates patterns in the message.

3. The computing apparatus of claim 1 wherein the first functionality comprises reclassification functionality that initiates a reclassification process.

4. The computing apparatus of claim 1 wherein the program instructions further direct the processing system to, responsive to a selection of the second functionality, implement the second functionality only in the second category.

5. The computing apparatus of claim 1 wherein the message was examined by an email service for a presence of at least one feature of the one or more features, and classified by the email service as belonging to the first category responsive to the presence of the at least one feature.

6. The computing apparatus of claim 1 wherein the first functionality comprises a delete functionality that initiates a delete process for messages received prior to initiating the delete process.

7. The computing apparatus of claim 1 wherein the first functionality comprises a delete functionality that initiates a delete process for messages received after initiating the delete process.

8. The computing apparatus of claim 1 wherein the second functionality comprises a display functionality that initiates a display process for generating a view comprising messages associated with the second category.

9. A method of operating an email service comprising:
categorizing, based on one or more features of a message, the message into a first category and a second category that is distinguished from the first category;
responsive to determining that the message corresponds to the first category and the second category, generating a user interface comprising:
a first functionality, based at least on a threshold of the first category, selectable for implementation; and
a second functionality, based at least on a threshold of the second category that is distinguished from the threshold of the first category, selectable for implementation;
responsive to a selection associated with the message, enabling display of the user interface; and
responsive to a selection of the first functionality, implementing the first functionality only in the first category.

10. A method of operating an email service comprising:
categorizing an electronic message into a first category and a second category distinguished from the first category; and
responsive to a selection associated with the electronic message:
generating, based at least on a threshold of the first category, a user interface comprising a first functionality selectable for implementation;
configuring, based at least on a threshold of the second category that is distinguished from the threshold of the first category, the user interface to comprise a second functionality selectable for implementation; and
enabling display of the user interface; and
responsive to a selection of the first functionality, implementing the first functionality only in the first category.

11. The method of claim 10 further comprising categorizing the electronic message to the first category based on content training that extrapolates patterns in the message.

12. The method of claim 10 wherein the first functionality comprises a reclassification functionality that initiates a reclassification process.

13. The method of claim 10 further comprising, responsive to a selection of the second functionality, implementing the second functionality only in the second category.

14. The method of claim 10 wherein categorizing the electronic message into the first category comprises examining the electronic message for a presence of at least one feature of the one or more features that is associated with at least the first category and, when the one feature is present, categorizing the electronic message as belonging to the first category.

15. The method of claim 10 wherein the first functionality comprises a delete functionality that initiates a delete process for messages received prior to initiating the delete process.

16. The method of claim 10 wherein the first functionality comprises a delete functionality that initiates a delete process for messages received after initiating the delete process.

17. The method of claim 10 wherein the second functionality comprises a display functionality that initiates a display process for generating a view comprising messages associated with the second category.

18. The method of claim 9 further comprising categorizing the message to the first category further based on content training that extrapolates patterns in the message.

19. The method of claim 9 further comprising, responsive to a selection of the second functionality, implementing the second functionality only in the second category.

20. The method of claim 9 further comprising updating classification procedures based on data of interactions with the message.

* * * * *